United States Patent
Little et al.

(10) Patent No.: US 8,488,922 B2
(45) Date of Patent: Jul. 16, 2013

(54) MULTI-CHANNEL DISPERSION COMPENSATOR

(75) Inventors: Brent E. Little, Glen Head, NY (US); Wei Chen, Ellicott City, MD (US)

(73) Assignee: Infinera Corporation, Sunnyvale, CA (US)

( * ) Notice: Subject to any disclaimer, the term of this patent is extended or adjusted under 35 U.S.C. 154(b) by 135 days.

(21) Appl. No.: 11/934,530

(22) Filed: Nov. 2, 2007

(65) Prior Publication Data
US 2009/0116786 A1 May 7, 2009

(51) Int. Cl.
*G02B 6/26* (2006.01)
*G02B 6/42* (2006.01)

(52) U.S. Cl.
USPC ........ 385/27; 385/3; 385/24; 385/32; 385/39; 385/50

(58) Field of Classification Search
None
See application file for complete search history.

(56) References Cited

U.S. PATENT DOCUMENTS

| | | | |
|---|---|---|---|
| 6,289,151 B1 * | 9/2001 | Kazarinov et al. | 385/32 |
| 6,766,083 B2 * | 7/2004 | Bona et al. | 385/40 |
| 7,035,495 B2 | 4/2006 | Takahashi et al. | |
| 7,162,120 B2 | 1/2007 | Yamazaki | |
| 2002/0181878 A1 * | 12/2002 | Schneider et al. | 385/50 |

* cited by examiner

*Primary Examiner* — Uyen Chau N Le
*Assistant Examiner* — Chad Smith
(74) *Attorney, Agent, or Firm* — Dunlap Codding LLP; David L. Soltz

(57) ABSTRACT

A multi-channel dispersion compensator comprising an optical signal waveguide that forms an input end for receiving an optical signal and an output end for providing a filtered optical signal. The multi-channel dispersion compensator also includes a series of closed-loop resonators providing frequency delay to at least one channel of the optical signal. The optical signal waveguide and each closed-loop resonator form a tunable coupler having a coupling value. The coupling value for each tunable coupler is selected to minimize constant dispersion and linear slope dispersion of the optical signal. Methods of fabrication and use are also described.

15 Claims, 5 Drawing Sheets

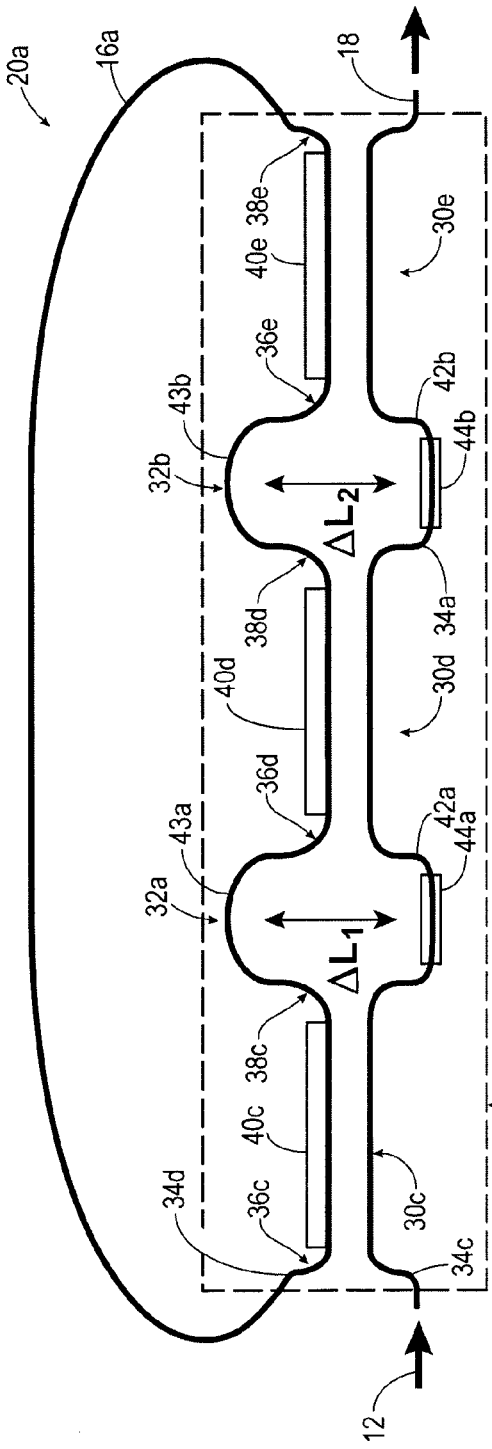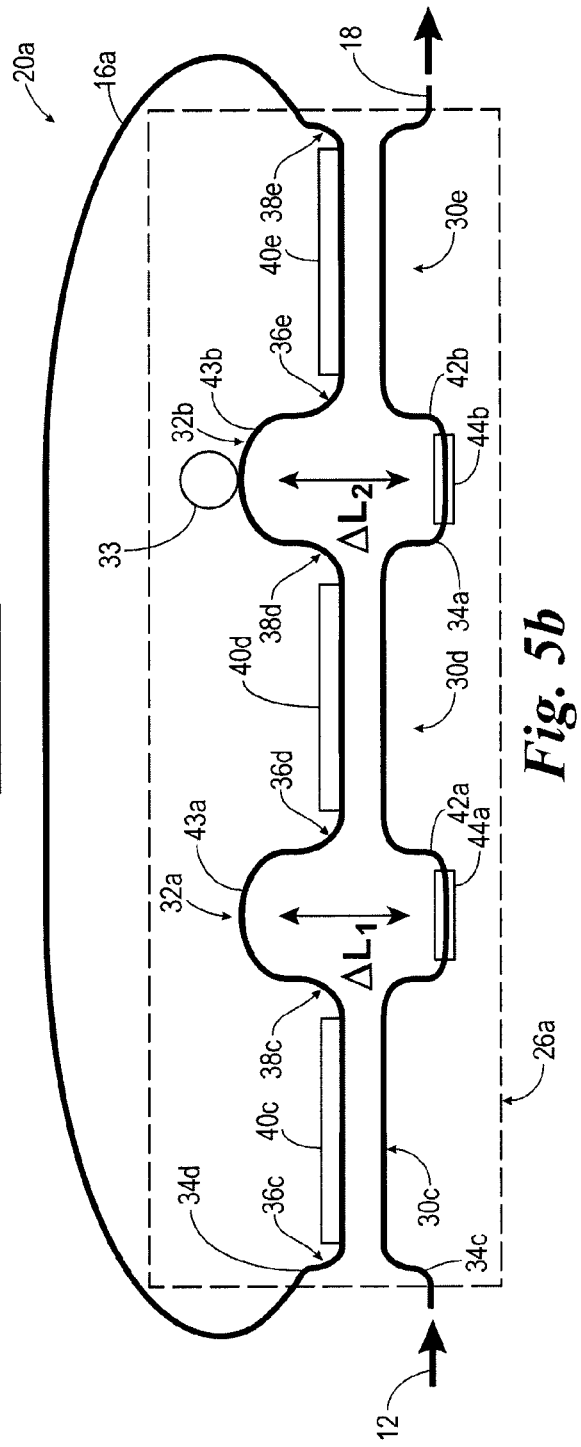

MULTI-CHANNEL DISPERSION COMPENSATOR

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE §1.52(E)(5))

Not Applicable.

BACKGROUND OF THE INVENTION

Planar light-wave circuits, also known as planar light-wave chips (PLCs), are optical devices having optical components and networks disposed monolithically within stack(s) of optical thin films and supported by a common mechanical substrate such as a semiconductor or glass wafer. PLCs are typically designed to provide specific transport or routing functions within fiber-optic communications networks. These networks are distributed over a multitude of geographically-dispersed terminals and commonly include transport between terminals via single-mode optical fibers.

Wavelength-division multiplexing (WDM) is a commonly employed technology within telecommunication systems that provides transmission of multiple optical signals on a signal optical fiber by using different wavelengths to carry different signals. In the WDM system, each optical carrier signal is transmitted within a narrow wavelength band centered around a center wavelength. Each band is commonly referred to as an optical channel and is generally characterized or referred to by a single center wavelength ($\lambda_x$).

Within communication systems, chromatic dispersion in an optical fiber or within other optical components limits pulse propagation distances and/or bit rates. Dispersion is generally wavelength-dependent and causes a broadening of the optical signal as it propagates along the length of the optical fiber. Different wavelengths travel at different speeds along the length of the optical fiber, and as signals broaden due to dispersion, it may become difficult to distinguishing one pulse from another.

Numerous attempts have been made to limit the negative effects of such dispersion. For example, ring resonators act as dispersion compensators. The effect of the ring resonator depends on the coupling value and the size of the ring. Generally, a wavelength near resonance will couple into the ring and circulate before coupling out of the ring. Wavelengths closer to the resonant wavelength spend a greater amount of time circulating within the ring, while "off-resonance" wavelengths spend little or no time within the ring. Effectively, this process compensates for dispersion by speeding up "slow" wavelengths that will spend little or no time within the ring resonator and slowing down "fast" wavelengths that will circulate multiple times within the ring resonator. Absolute time spent in the ring depends on the coupling value. Thus, adjusting the coupling value can adjust the magnitude of dispersion.

Across a system's operating band of signals, there is an average dispersion value and a slope component to chromatic dispersion. The average value and the degree of slope may or may not be related, and depend on the details of the system. For example, the average dispersion value and the degree of slope may be related in a communication system that is dominated by one type of optical fiber.

BRIEF SUMMARY OF THE INVENTION

In one embodiment, the presently disclosed and claimed invention is a multi-channel dispersion compensator including an optical signal waveguide, and a series of closed-loop resonators. The optical signal waveguide forms an input end for receiving an optical signal and an output end for providing a filtered optical signal. The series of closed-loop resonators are constructed to provide frequency delay to at least two channels of the optical signal, wherein the optical signal waveguide and each closed-loop resonator form a tunable coupler having a coupling value. The coupling value for each tunable coupler is selected so as to minimize constant dispersion and linear slope dispersion of the optical signal.

In one version, the multi-channel dispersion compensator further comprises a controller selectively providing a signal to adjust power dissipation of the tuning element. The tuning element can be located adjacent to the optical signal waveguide, and the signal provided by the controller can be based on a bit rate error. Optionally, the controller analyzes a bit rate error provided by an external source. In one embodiment, the tuning element is a thermal device placed in thermal communication with the optical signal waveguide.

The multi-channel dispersion compensator can also include at least one ring resonator adjacent to the optical signal waveguide and forming at least one ring-assisted interferometer, a first tuning element located adjacent to the optical signal waveguide, and a second tuning element located adjacent to the ring resonator.

The coupling value can be selected so as to minimize high order dispersion. The optical signal waveguide can be bidirectional.

Another version of the presently disclosed and claimed invention is directed to a multi-channel dispersion compensator for adjusting constant dispersion and linear dispersion of an optical signal. The multi-channel dispersion compensator is provided with an optical signal waveguide, at least one closed loop resonator, and a tunable coupler. The optical signal waveguide has an input end for receiving the optical signal and an output end for providing a filtered optical signal. The at least one closed loop resonator is constructed to provide frequency delay to at least two channels of the optical signal. The tunable coupler couples the optical signal between the optical signal waveguide and the closed loop resonator and provides filtered optical signals to the output end of the optical signal waveguide. The tunable coupler adjustably tunes the optical signal to alter linear slope dispersion and constant dispersion of the optical signal.

In one embodiment, the tunable coupler of the multi-channel dispersion compensator comprises a first directional coupler, a second directional coupler and a differential phase cell. The first directional coupler has a first arm disposed on the optical signal waveguide and a second arm disposed on the closed loop resonator. The second directional coupler has a first arm disposed on the optical signal waveguide and a second arm disposed on the closed loop resonator. The differential phase cell is formed between the first directional coupler and the second directional coupler. The differential phase cell has a first arm disposed on the optical signal waveguide having a first length ($L_1$) and a second arm disposed on the closed loop resonator having a second length ($L_2$), wherein ($L_1 \neq L_2$).

The tunable coupler of the multi-channel dispersion compensator can further include a tuning element adjacent to the differential phase cell. The tuning element can be a thermal device in thermal communication with at least a portion of the optical filter.

In one version, the tunable coupler of the multi-channel dispersion compensator is provided with at least three directional couplers with each directional coupler having a first arm disposed on the optical signal waveguide and a second arm disposed on the closed loop resonator, and at least two differential phase cells with each differential phase cell connecting adjacent directional couplers. Each differential phase cell has a first arm disposed on the optical signal waveguide and a second arm disposed on the closed loop resonator. The first arm has a first length ($L_1$) and the second arm has a second length ($L_2$), wherein ($L_1 \neq L_2$) for at least one differential phase cell. In one version, the tunable coupler is capable of adjustably tuning the optical signal to alter high order dispersion.

In other versions, the multi-channel dispersion compensator is further provided with at least one ring resonator adjacent to the optical signal waveguide (e.g., bidirectional) and forming at least one ring-assisted interferometer, at least one tuning element adjacent to the optical signal waveguide, a second tuning element adjacent to the ring resonator, and a controller selectively altering power dissipation of the tuning elements based on bit rate error.

In another version, the presently disclosed and claimed invention is directed to a method of fabricating a multi-channel dispersion compensator, having an optical signal waveguide adjacent a closed-loop resonator forming a tunable coupler. In this method, a wavelength-dependent coupling value is calculated for the tunable coupler; and an image is formed in a photoresist layer on a core material constructed of optically transparent material. The image has a predetermined pattern indicative of an optical signal waveguide positioned adjacent to a closed-loop resonator forming a tunable coupler. The tunable coupler is designed for the wavelength-dependent coupling value. The photoresist layer is developed to form a mask having a predetermined pattern of the multi-channel dispersion compensator, and then the predetermined pattern of the multi-channel dispersion compensator is transferred into the core material.

In another version, the presently disclosed and claimed invention is directed to a planar lightwave circuit provided with a substrate, a cladding on the substrate, and a multi-channel dispersion compensator on the cladding. The multi-channel dispersion compensator is provided with a first directional coupler, a second directional coupler, and a differential phase cell. The first directional coupler has an input end, an output end, and a coupling region. The second directional coupler has an input end, an output end, and a coupling region, wherein the output end of the second directional coupler and the input end of the first directional coupler are connected to form a closed-loop resonator. The differential phase cell connects the output end of the first directional coupler with the input end of the second directional coupler, the differential phase cell has a first arm with a first length ($L_1$) and a second arm with a second length ($L_2$), wherein ($L_1 \neq L_2$).

In another version, the presently disclosed and claimed invention is directed to a method of altering constant dispersion and linear slope dispersion of an optical signal propagating through an optical signal waveguide coupled to a closed ring resonator forming a tunable coupler. In this method, a tuning element of the tunable coupler is tuned to alter constant dispersion and linear slope dispersion of the optical signal. The tunable coupler is provided with a first directional coupler, a second directional coupler, a differential phase cell, and a tuning element. The first directional coupler has an input end, an output end, and a coupling region. The second directional coupler has an input end, an output end, and a coupling region, wherein the output end of the second directional coupler and the input end of the first directional coupler are connected to form a closed-loop resonator. The differential phase cell is positioned between the first directional coupler and the second directional coupler. The differential phase cell has a first arm with a first length ($L_1$) and a second arm with a second length ($L_2$), wherein ($L_1 \neq L_2$). The tuning element is adjacent to one of the arms of the differential phase cell. The tuning element is capable of shifting the optical phase of the optical signal.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4B and 5A-5B are schematic block diagrams of an exemplary tunable couplers for use in the wavelength-dependent dispersion compensator of FIG. 2.

DETAILED DESCRIPTION OF EXEMPLARY EMBODIMENTS

Figure 1:
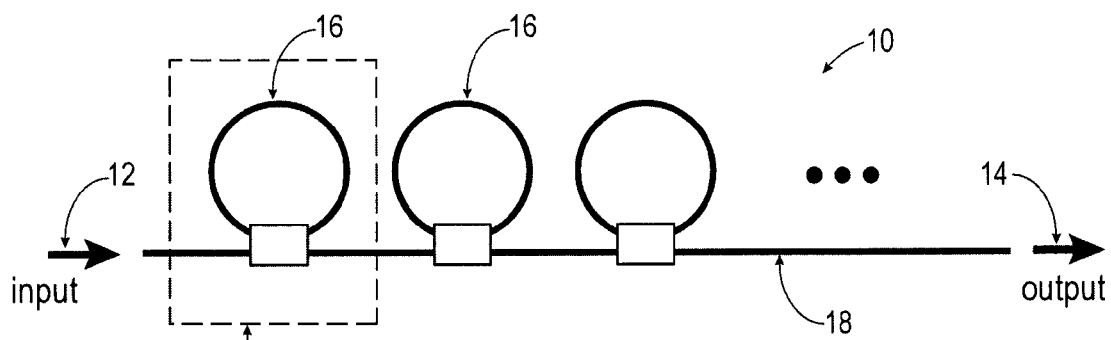
FIG. 1 is a schematic block diagram of an exemplary multi-channel dispersion compensator for minimizing constant dispersion and at least linear slope dispersion in an optical signal in accordance with the present invention.

Exemplary embodiments of the invention are shown in the above-identified figures and described in detail below. In describing the exemplary embodiments, like or identical reference numerals are used to identify common or similar elements. The figures are not necessarily to scale and certain features and certain views of the figures may be shown exaggerated in scale or in schematic in the interest of clarity and conciseness.

Figure 2:
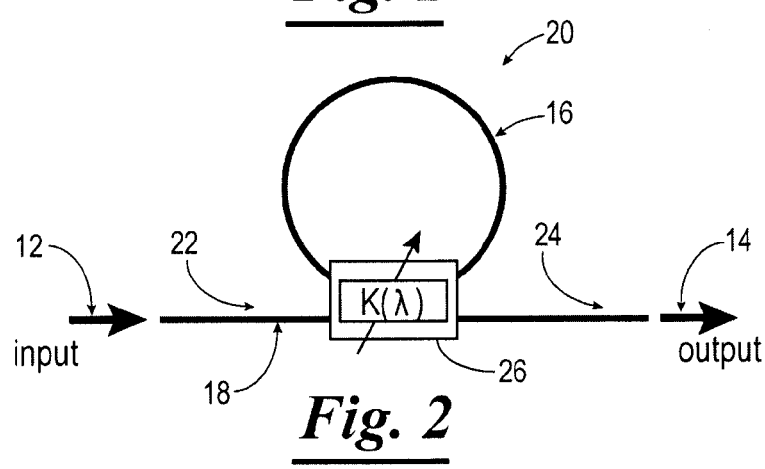
FIG. 2 is a schematic block diagram of an exemplary wavelength-dependent dispersion compensator for use in the multi-channel dispersion compensator illustrated in FIG. 1.

Referring now to the drawings and in particular to FIGS. 1 and 2, shown therein and designated by reference numeral 10 is a multiple-channel dispersion compensator for adjusting constant dispersion and at least linear dispersion of an optical signal 12 to provide a filtered optical signal 14. Generally, the multiple-channel dispersion compensator 10 includes a plurality of closed loop resonators 16 coupled to an optical signal waveguide 18. The optical signal 12 is input into and out of each closed loop resonator 16 serially to provide the filtered optical signal 14. The multi-channel dispersion compensator 10 includes at least one wavelength-dependent dispersion compensator 20.

As illustrated in FIG. 2, the wavelength-dependent dispersion compensator 20 includes at least one closed loop resonator 16 coupled to the optical signal waveguide 18 so as to form an input port 22 upstream from the closed loop resonator 16, and an output port 24 downstream from the closed loop resonator 16. In general, the wavelength-dependent dispersion compensator 20 receives the optical signal 12 from the input port 22 and provides the filtered optical signal 14 to the output port 24. Alternatively, the wavelength-dependent dispersion compensator 20 is bidirectional or reversible, i.e., the wavelength-dependent dispersion compensator 20 works the same if the output port 24 becomes the input port 22.

The wavelength dependent dispersion compensator 20 also includes a tunable coupler 26. The optical signal 12 is input into the input port 22 of the optical signal waveguide 18 and coupled into and out of the closed loop resonator 16 by the tunable coupler 26. The adjustment of chromatic dispersion and the operating bandwidth of the wavelength-dependent dispersion compensator 20 is determined by the design of the closed-loop resonator 16 and a coupling value $K(\lambda)$ of the tunable coupler 26.

Figure 3:
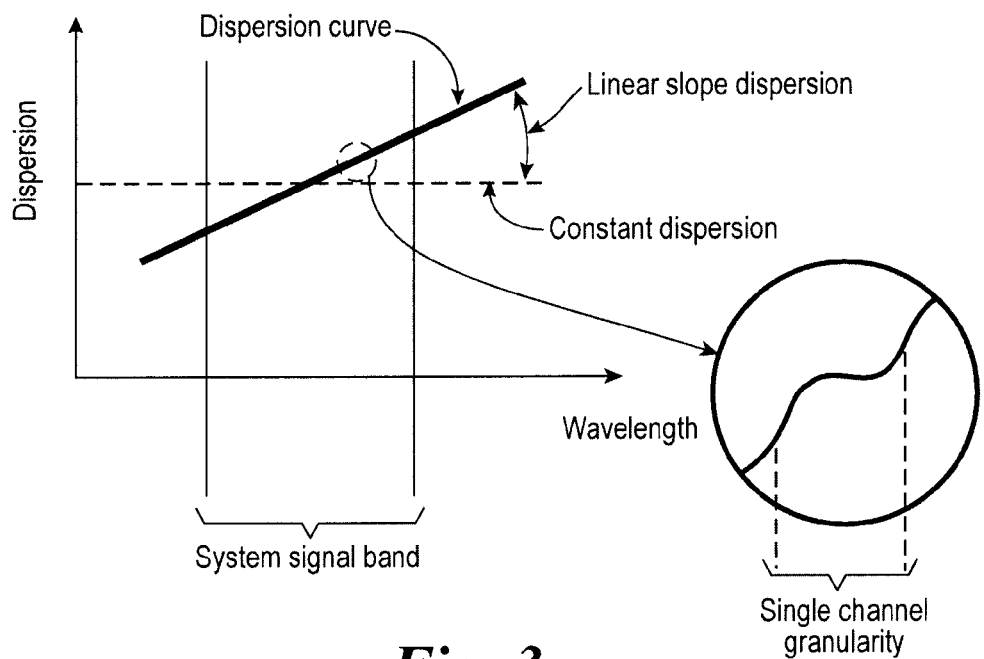
FIG. 3 is a diagram illustrating a typical dispersion curve including constant dispersion and linear slope dispersion of a system signal band.

Chromatic dispersion as a function of wavelength $\lambda$ of the optical signal 12 is graphically represented in FIG. 3. As previously discussed, generally in relation to chromatic dispersion, there is an average dispersion value, herein referred to as constant dispersion, a slope component, herein referred to as linear slope dispersion, and in some instances higher order dispersion. Constant dispersion includes dispersion seen across all channels of the optical signal 12. Linear slope dispersion is the average differential amount of dispersion between channels based on the differential wavelengths. Channels of the optical signal 12 that have different wavelengths but travel the same path will generally experience different amounts of dispersion. Linear slope dispersion as illustrated in FIG. 3 demonstrates that longer wavelengths are generally more dispersive than shorter wavelengths. However, in some instances, longer wavelengths may be less dispersive than shorter wavelengths.

Although linear slope dispersion is generally regarded as a linear relationship between the amount of dispersion across a system band signal, there is also often single channel granularity within each channel of the optical signal 12. The use of multiple closed-loop resonators 16 within the multi-channel dispersion compensator 10 tends to smooth out single channel granularity. The more multiple closed-loop resonators 16 included within the design of the multi-channel dispersion compensator 10, the smoother the linear relationship. In general, the number of closed-loop resonators 16 is determined by physical and economic limitations of the multiple-channel dispersion compensator 10.

Referring again to FIG. 2, as previously discussed, the adjustment of chromatic dispersion and the operating bandwidth of the wavelength-dependent dispersion compensator 20 is determined by the design of the closed-loop resonator 16. A wavelength of the optical signal 12 near resonance will couple into the closed-loop resonator 16 and circulate before coupling out of the closed-loop resonator 16. The closed-loop resonator 16 is generally designed to provide an inverse effect of the optical fiber that the optical signal 12 is propagating through. For example, if wavelength $\lambda_x$ travels at a faster rate through the optical fiber than wavelength $\lambda_y$, then the closed-loop resonator 16 is designed such that wavelength $\lambda_x$ travels at a slower rate in the closed-loop resonator 16 than wavelength $\lambda_y$. The time spent in the closed-loop resonator 16 depends on the coupling value $K(\lambda)$. Thus, adjusting the coupling value $K(\lambda)$ adjusts the compensation of dispersion.

The tunable coupler 26 provides the coupling value $K(\lambda)$. The coupling value $K(\lambda)$ can be mathematically separated into a Taylor series as a function of wavelength $\lambda$ as shown in Eq. 1 below. The constant term $K_0$ identifies constant dispersion across all wavelengths $\lambda$. The second term proportional to wavelength $\lambda$ identifies linear slope dispersion wherein the constant of proportionality is $a_1$. The third term gives rise to parabolic slope dispersion. Higher order terms may also exist. The tunable coupler 26 provides for tuning of the terms $K_0$, $a_1$, and possible higher order terms. Preferably, $K_0$, $a_1$, and the higher order terms are independently adjustable.

$$K(\lambda)=K_0+a_1\lambda+a_2\lambda+ \qquad [EQ.\ 1]$$

Figure 4A:
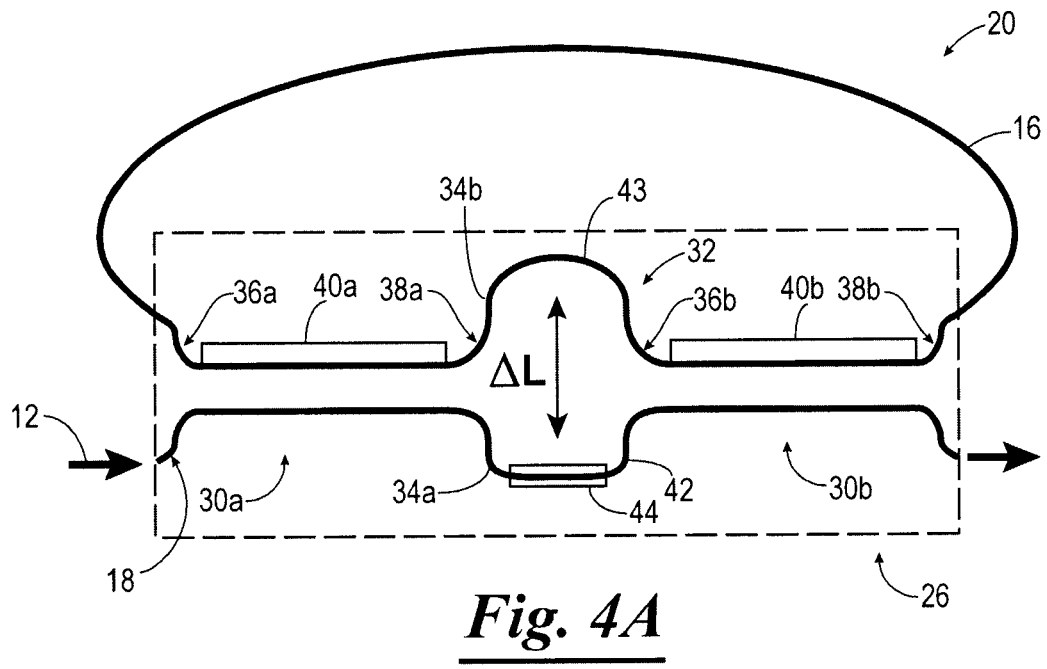
Figure 4B:
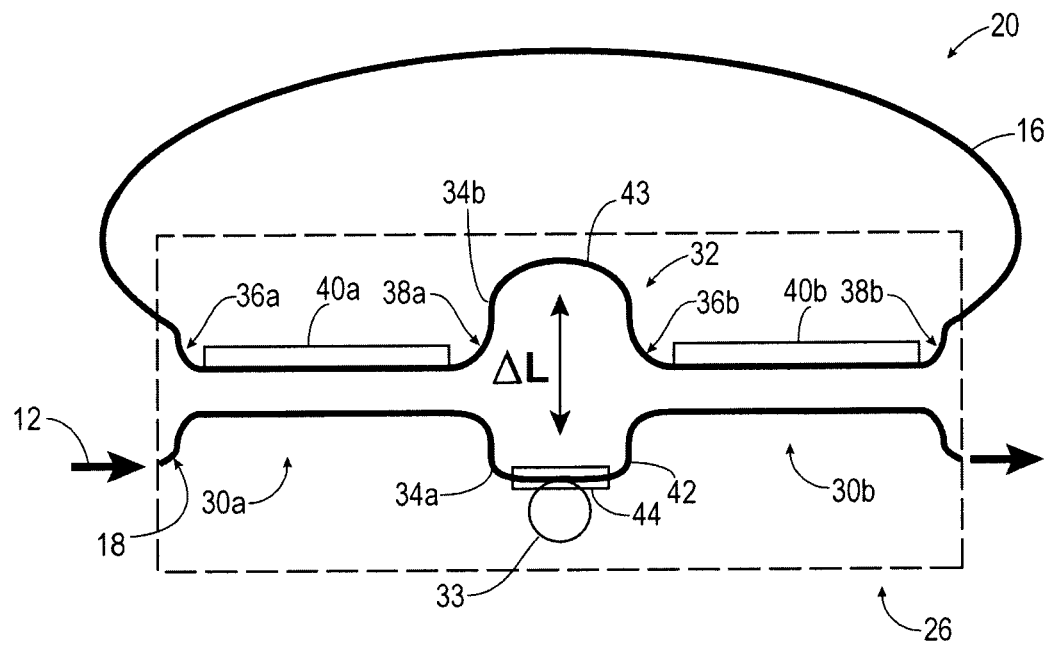

FIG. 4a illustrates one embodiment of the wavelength-dependent dispersion compensator 20 wherein the tunable coupler 26 includes at least two directional couplers designated by reference numerals 30a and 30b and at least one differential phase cell 32 interleaved between the directional couplers 30a and 30b. The tunable coupler 26 forms an optical filter such as an infinite-impulse response filter or a finite-impulse response filter. For example, the tunable coupler 26 in FIG. 4a is a Mach-Zehnder interferometer composed of two directional couplers 30a and 30b and one differential phase cell 32. Alternatively, the tunable coupler 26 can include a ring resonator 33 forming a ring-assisted interferometer composed of two directional couplers 30a and 30b and one differential phase cell 32 as illustrated in FIG. 4b. Additionally, multiple ring resonators 33 may be attached to the differential phase cell 32.

In a preferred embodiment, the directional couplers 30a and 30b and differential phase cell 32 are constructed from a first waveguide 34a and a second waveguide 34b. Preferably, the first waveguide 34a is formed by the optical signal waveguide 18 and the second waveguide 34b is formed by the closed-loop resonator 16.

Each directional coupler 30a and 30b has an input port, an output port, and a coupling region where the optical signal 12 couples between the first and second waveguides 34a and 34b. In particular, directional coupler 30a has an input port 36a, an output port 38a, and a coupling region 40a. In the same regard, directional coupler 30b has an input port 36b, an output port 38b, and a coupling region 40b.

The differential phase cell 32 connects directional couplers 30a and 30b by connecting the output port 38a of the directional coupler 30a with the input port 36b of the directional coupler 30b. Additionally, by connecting the output port 38b of directional coupler 30b with the input port 36a of directional coupler 30a, a closed loop is formed, namely the closed loop resonator 16.

The differential phase cell 32 includes a first arm 42 formed from a portion of the first waveguide 34a and a second arm 43 formed from a portion of the second waveguide 34b. The differential phase cell arms 42 and 43 have lengths $L_1$ and $L_2$ having a differential path length $\Delta L$. The differential phase cell 32 causes a differential phase shift and filtering function to light signals traversing between the directional couplers 30a and 30b. The differential phase cell 32 is chosen such that the differential path length $\Delta L$ is greater than zero resulting in an asymmetric Mach-Zehnder filter. The differential phase cell 32 can be designed for a specific differential path length $\Delta L$ related to the proportionality constant $a_1$ which is associated with linear slope dispersion. The amount of differential path length $\Delta L$ can be adjusted and typically depends upon the amount of dispersion, the number of channels to be compensated, and the bandwidth that the channels occupy.

The tunable coupler 26 also includes a tuning element 44 located adjacent to at least one arm 42 and/or 43 of the differential phase cell 32. The tuning element 44 is able to shift the optical phase of the optical signal 12. Additionally, the tuning element 44 may be located adjacent to at least one ring resonator 33. The tuning element 44 may comprise a device that is thermal, accoustooptic, electrooptic, magnetooptic, piezoelectric, pressure oriented, and/or the like. Preferably, the tuning element 44 is a thermal device placed in thermal communication with the first arm 42 of the differential phase cell 32. As is well known in the art, selective heating the first arm 42 and/or second arm 43 alters the refractive index and thereby modulates the phase difference of light propagating through the first arm 42 and/or 43.

As the thermal optical coefficient can be positive or negative depending on the type of material used, the phase change induced by the thermal optic effect can be either positive and/or negative. Alternatively, the tuning element 44 can heat either the first arm 42, the second arm 43, and/or at least one ring resonator 33 to provide alterations of other optical properties such as center wavelength, amplitude, group delay, birefringence, attenuation, gain, and/or shape. Using these properties, the tuning element 44 is able to adjust the coupling value $K(\lambda)$ of the wavelength-dependent dispersion compensator 20 by altering $K_0$, $a_1$, and possible higher order terms as described in Eq. 2 below.

$$K(\lambda) = [K_0 + a_1 \lambda + a_2 \lambda \ldots] \quad [\text{EQ. 2}]$$

FIG. 5a illustrates another embodiment of a wavelength dependent dispersion compensator 20a. The compensator 20a includes a closed loop resonator 16a and a tunable coupler 26a. The tunable coupler 26a includes at least three directional couplers 30c, 30d, and 30e. The tunable coupler 26a also includes at least two differential phase cells 32a and 32b. The tunable coupler 26a forms a two-stage optical filter such that at least one of the optical filters includes a finite-impulse response filter and/or an infinite-impulse response filter. For example, the tunable coupler 26a in FIG. 5a is a two-stage Mach-Zehnder interferometer composed of three directional couplers 30c, 30d, and 30e and two differential phase cells 32a and 32b. Alternatively, at least one stage of the tunable coupler 26a can include a ring resonator 33 forming a ring-assisted interferometer as illustrated in FIG. 5b. Additionally, multiple ring resonators 33 may be attached to both differential cells 32a and 32b forming a two-stage ring-assisted interferometer composed of three directional couplers 30c, 30d, and 30e and two differential phase cells 32b and 32c.

The directional couplers 30c, 30d, and 30e and differential phase cells 32a and 32b are formed from a first waveguide 34c and a second waveguide 34d and constructed in a similar manner as the directional couplers 30a and 30b and differential phase cell 32a described above. Preferably, the first waveguide 34c is formed by the optical signal waveguide 18 and the second waveguide 34d is formed by the closed-loop resonator 16a.

Each directional coupler 30c, 30d, and 30e has an input port, an output port, and a coupling region where the optical signal 12 couples between the first and second waveguides 34c and 34d. In particular, directional coupler 30c has an input port 36c, an output port 38c, and a coupling region 40c. In the same regard, directional coupler 30d has an input port 36d, an output port 38d, and a coupling region 40d and directional coupler 30e has an input port 36e, an output port 38e, and a coupling region 40e.

Each differential phase cell 32a and 32b connects adjacent directional couplers 30c, 30d, and 30e. For example, the differential phase cell 32a connects output port 38c of the directional coupler 30c with the input port 36d of the directional coupler 30d. Differential phase cell 32b connects output port 38d of the directional coupler 30d with the input port 36e of the directional coupler 30e. The differential phase cells 32a and 32b each include a first arm 42a and 42b formed from a portion of the first waveguide 34c and a second arm 43a and 43b formed from a portion of the second waveguide 34d. Additionally, by connecting the output port 38e of directional coupler 30e with the input port 36c of directional coupler 30c, a closed loop is formed, namely the closed loop resonator 16a.

The differential phase cell arms 42a and 43a have lengths $L_{1A}$ and $L_{1B}$ having a differential path length $\Delta L_1$. Preferably, the differential path length $\Delta L_1$ is greater than zero. Similarly, the differential phase cell arms 42b and 43b have lengths $L_{2A}$ and $L_{2B}$ having a differential path length $\Delta L_2$. Preferably, the differential path length $\Delta L_2$ is greater than zero. The differential path lengths $\Delta L_1$ and $\Delta L_2$ determine the proportionality constant $a_1$ and/or possible higher order terms associated with linear slope dispersion. The amount of differential path lengths $\Delta L_1$ and $\Delta L_2$ can be adjusted and typically depend upon the amount of dispersion, the number of channels to be compensated, and the bandwidth that the channels occupy.

The tunable coupler 26a also includes tuning elements 44a and 44b located adjacent at least one arm 42a, 42b, 43a, and/or 43b of the differential phase cells 32a and/or 32b. The tuning elements 44a and 44b are constructed in a similar manner as the tuning element 44 described above. For example, the tuning element 44a and 44b can be thermal devices placed in thermal communication with the first arm 42a of differential phase cell 32a and the first arm 42b of differential phase cell 32b. The tuning elements 44a and 44b can be tuned to adjust the coupling value $K(\lambda)$ of the tunable coupler by altering $K_0$, $a_1$, and possible additional higher order terms as described in Eq. 2 above. Alternatively, the tuning elements 44a and 44b can be independently tuned to adjust the coupling value $K(\lambda)$ of the tunable coupler 26 and in particular alter $K_0$ and $a_1$ as described in Eq. 3 below.

$$K(\lambda) = [K_0 + [a_1 \lambda] + [a_2 \lambda]] \quad [\text{EQ. 3}]$$

Figure 6:
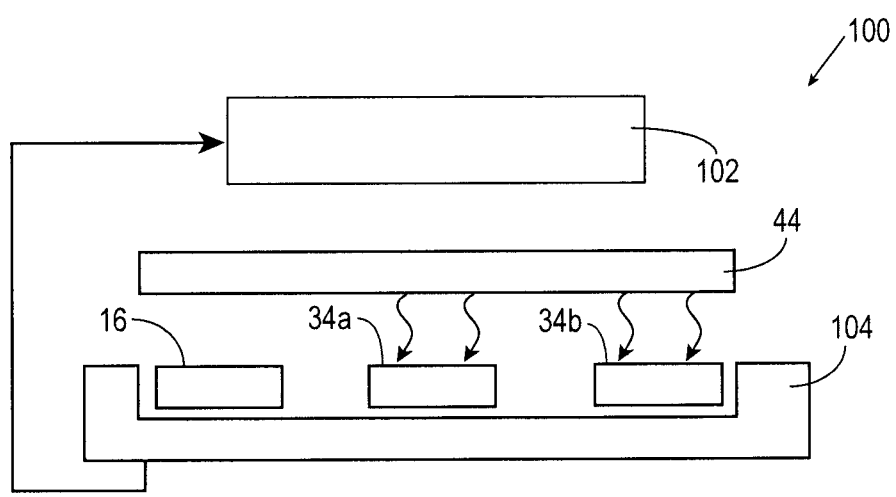
FIG. 6 is a schematic block diagram of a control system for use with a multi-channel dispersion compensator having any of the tunable couplers depicted in FIGS. 4A-4B and 5A-5B.

Referring now to FIG. 6, shown therein is an embodiment of the wavelength-dependent dispersion compensator 20 including a control system 100 to adjust, regulate, and/or control the power dissipation of the tuning element 44. By way of example, the control system 100 will be described for controlling the tuning element 44. However, it should be understood that the following description is equally applicable to control the tuning elements 44a and 44b. The control system 100 includes a controller 102 and a feedback mechanism 104 provided by the system. Preferably, the control system 102 utilizes an automatic feedback mechanism 104. However, the feedback mechanism 104 may also be user operated.

In one embodiment, the controller 102 can alter the output phase of waveguides 34a and/or 34b and/or closed-loop resonator 16 and alter the power dissipation of the tuning element 44 based on the bit error rate (BER). The BER is the ratio of the number of failed bits to the total number of bits sent over the channel of the optical signal 12. As the communication system changes, there are generally several points within the system at which BER is determined. The controller 102 can measure for the BER and/or the extract BER from an external source. The controller 102 adjusts the tuning element 44 to compensate for the BER.

Figure 7:
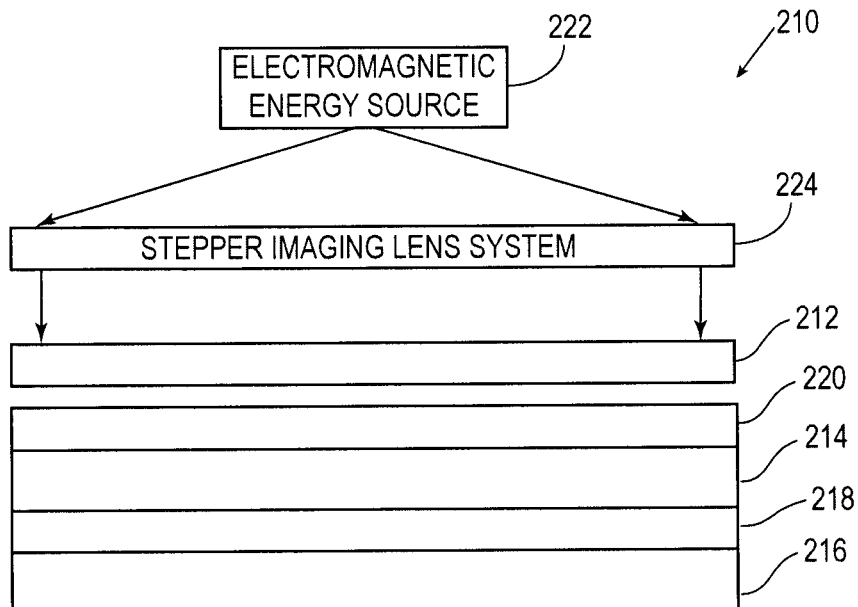
FIG. 7 is a diagrammatic view of an exemplary photolithography system for transferring patterns of a multi-channel dispersion compensator on a photomask to a thin film optical material on a substrate in accordance with the present invention.

Referring now to FIG. 7, the multi-channel dispersion compensator 10 can be implemented as part of an integrated planar lightwave circuit utilizing any fabrication technology known in the art. For example, shown in FIG. 7 and designated by a reference numeral 210 is an exemplary photolithography system for transferring one or more patterns of the multi-channel dispersion compensator 10 on a photomask 212 to a core material 214 on a substrate 216 in accordance with the present invention. In this embodiment, the core material 214 is a thin film constructed of a material selected from a group consisting of silica, doped silica, silicon oxynitride, silicon oxycarbide, Indium Phosphide, Gallium Arsenide, high index polymers, and other material suitable for making optical waveguides including combinations thereof. The core material 214 is deposited on a cladding material 218 constructed of a material having an index of refraction that is lower than the index of refraction of the core material 214. The cladding material 218 can be selected from a group consisting of silica, lower index silicon oxynitride, lower index silicon oxycarbide, Indium Galium Arsenide Phosphide, polymers, and other material suitable for making optical waveguides including combinations thereof. Various examples of combinations of thin film for forming the core material 214 and cladding material 218 are discussed in U.S. Pat. No. 6,614,977, the entire content of which is hereby incorporated herein by reference.

A photoresist layer 220 is disposed on the core material 214. In general, the photoresist layer 220 is constructed of a material that prevents material beneath the photoresist layer 220 from being removed or material directly underneath the photoresist layer 220 to be removed during a subsequent process for removing predetermined parts of the core material 214, such as an etching process. Thus, the photoresist layer 220 can be either a positive photoresist or a negative photoresist. The present invention will be described herein by way of example as the photoresist layer 220 being a positive photoresist and in side-elevation. The photoresist layer 220 can be provided on the core material 214 utilizing any suitable process, such as spin coating, for example.

The photolithography system 210 is also provided with an electromagnetic energy source 222 directing energy through a stepper imaging lens system 224 and the photomask 212 to the photoresist layer 220. The electromagnetic energy source 222, such as a high intensity ultraviolet light source or the like, provides electromagnetic energy capable of reacting with the photoresist layer 220 to transfer the pattern on the photomask 212 to the photoresist layer 220.

The stepper imaging lens system 224 receives the electromagnetic energy from the electromagnetic energy source 222 and directs such energy to the photomask 212 which exposes parts of the photoresist layer 220 to the electromagnetic energy. Such exposure can be by any suitable method, such as contact, proximity, and projection.

Figure 8:
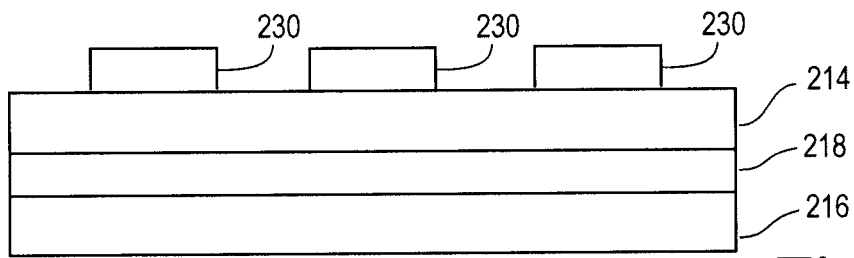
FIG. 8 is a diagrammatic view of an exemplary positive mask of a multi-channel dispersion compensator formed on the thin film optical material utilizing the photolithography system of FIG. 7.
Figure 9:
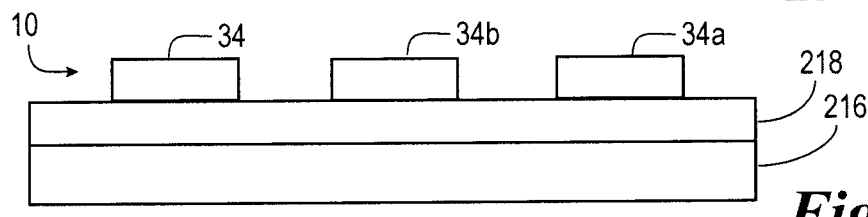
FIG. 9 is a diagrammatic view of a multi-channel dispersion compensator formed from the thin film optical material using the mask depicted in FIG. 8.
Figure 10:
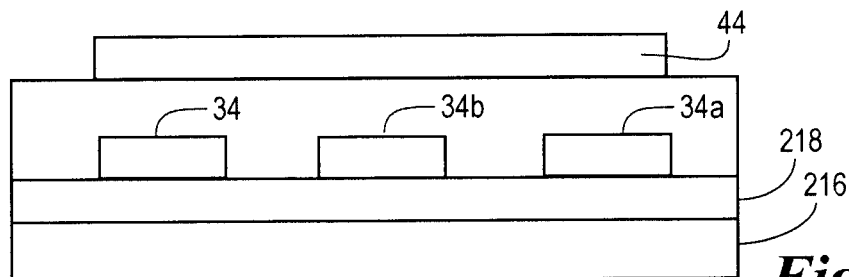
FIG. 10 is a diagrammatic view of a multi-channel dispersion compensator including a tuning element formed from the thin film optical material as depicted in FIG. 9.

Once the photoresist layer 220 has been exposed, then such photoresist layer 220 is developed to form a mask 230 in the geometry of the multi-channel dispersion compensator 10 as shown in FIG. 8. Once the mask 230 is formed, then the pattern formed by the mask 230 is transferred into the core material 214 to form the multi-channel dispersion compensator 10 as shown in FIG. 10. The transferring can be accomplished by any suitable process, such as an etching process. It should be understood that the multi-channel dispersion compensator 10 forming elements of PLCs referred to herein may be formed using standard or later developed techniques used in the semiconductor industry to deposit and pattern optical waveguide materials, e.g., (dry-etch, wet-etch, flame hydrolysis deposition (FHD), chemical vapor deposition (CVD), reactive ion etching (RIE), physically enhanced CVD (PECVD), or the like.

Once the multi-channel dispersion compensator 10 is formed, the mask 230 is removed, and another layer of cladding material (not shown) can then be deposited over the entire surface and planarized if necessary utilizing any suitable process. For example, a process for applying another layer of cladding material is discussed in U.S. Pat. No. 6,768,828 entitled "Integrated Optical Circuit with Dense Planarized Cladding Layer"; the entire content of which is hereby expressly incorporated herein by reference. The tuning element 44 of the tunable coupler 26 is positioned in communication with differential phase cell 32. As illustrated in FIG. 10, the tuning element 44 can be layered above the layer of cladding material 234. Alternatively, the thermal device 44 can be placed within any layer of material forming the multi-channel dispersion compensator 10. For example, the tuning element 44 may be located within the layer of cladding material 234.

While the above methods for fabricating the multi-channel dispersion compensator 10 of the present invention are described above in terms of fabricating one multi-channel dispersion compensator 10, it should be apparent to those skilled in the art that such fabrication methods, as well as any other appropriate fabrication techniques currently known in the art or later developed, can be utilized to fabricate one or more multi-channel dispersion compensators 10, or portions thereof.

Computer software code can be utilized to allow a user to construct a virtual representation of the multi-channel dispersion compensator 10. For example, such a tool can be implemented utilizing Optical Waveguide Mode Suite (OWMS) and Beam propagation solver software available from Apollo Photonics Corp. of Burlington, Ontario, Canada. This software also allows for numeric simulation using a full vector Beam Propagation Method (FV-BPM) (see also, W. P Huang and C. L. Xu, "Simulation of three-dimensional optical waveguides by a full-vector beam propagation method," IEEE J. Selected Topics in Quantum Electronics, vol. 29, pp. 2639-2649, 1993, the entire content of which is hereby incorporated herein by reference). The FV-BPM takes into account polarization effects including rotation of the optical field.

For example, software code stored on one or more computer readable medium and executed by a suitable processor can be used to provide a user interface to the user (e.g., via a monitor of a computer system) which receives input from the user (e.g., via a keyboard and/or mouse of the computer system). The user can input information into the user interface that defines one or more parameters associated with the multi-channel dispersion compensator 10 or an intermediate device of the multi-channel dispersion compensator 10. The software code can then store the inputted parameters on the one or more computer readable medium and utilize the inputted parameters to generate and display a virtual representation of the multi-channel dispersion compensator 10 or an intermediate device of the multi-channel dispersion compensator 10 corresponding to such parameters. Such parameters received from the user can include for example one or more of the following: width, length of shape of the multi-channel dispersion compensator 10, wavelength-dependent dispersion compensator 20, closed loop resonator 16, optical signal waveguide 18, tunable coupler 26, and/or any other geometric feature or property of the multi-channel dispersion compensator.

As discussed above, in one embodiment, the virtual representation can be used to simulate the geometries and properties associated with the resulting multi-channel dispersion compensator 10. Further, such a virtual representation can be incorporated into a design application (such as OWMS) which allows the virtual representation to be positioned within a design in combination with other elements to form planar light-wave circuits, such as in the design of chips and/or wafers having a plurality of chips. Such capability allows the multi-channel dispersion compensator 10 designed by the user (or having predetermined parameters) to be evaluated in combination with other elements in an optical circuit.

It will be understood from the foregoing description that various modifications and changes may be made in the preferred and alternative embodiments of the present invention without departing from its true spirit. Simplicity of design within the description refers to design parameter considerations known within the art and may include financial and practical considerations for use of the device. This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A dispersion compensator, comprising:
a waveguide including an input end configured to receive an input optical signal and an output end configured to provide an output optical signal;
a first closed loop resonator,
the waveguide and the closed loop resonator constituting a tunable coupler, a first portion of the tunable coupler being a first optical coupler having an input configured to receive the input optical signal and an output, a second portion of the tunable coupler constituting a differential phase cell having an input coupled to the output of the first optical coupler and an output, a third portion of the tunable coupler being a second optical coupler having an input coupled to the output of the differential phase cell and an output configured to provide the output optical signal,
wherein, collectively, the first and second couplers and the differential phase cell constitute a Mach-Zehnder interferometer having first and second arms extending between the first and second couplers, the differential phase cell including the first and second arms of the Mach-Zehnder interferometer, the first arm having a first length and the second arm having a second length different than the first length, such that the first arm of the Mach-Zehnder interferometer includes a portion of the first closed loop resonator, and
the differential phase cell further including a tuning element configured to adjust a phase of light propagating in one of the first and second arms;
a second closed loop resonator optically coupled to a portion of the second arm of the Mach-Zehnder interferometer between the first and second couplers; and
a tuning element including a thermal device located adjacent to the second arm of the Mach-Zehnder interferometer and a portion of the second closed loop resonator, the thermal device overlapping the portion of the second arm of the Mach-Zehnder interferometer and the portion of the second closed loop resonator to adjust a temperature of the portion of the second arm of the Mach-Zehnder interferometer and a portion of the second closed loop resonator.

2. The dispersion compensator of claim 1, further comprising a controller selectively providing a signal to adjust power dissipation of the tuning element.

3. The dispersion compensator of claim 2, wherein the controller selectively provides the signal based on a bit error rate.

4. The dispersion compensator of claim 3, wherein the bit error rate is provided by a source external to the controller.

5. The dispersion compensator of claim 1, wherein the tuning element is a first tuning element and the thermal device is a first thermal device, the dispersion compensator further including a second tuning element having a second thermal device placed in thermal communication with the waveguide.

6. The dispersion compensator of claim 1, wherein the tunable coupler has an associated coupling value.

7. The dispersion compensator of claim 1, wherein the first optical coupler is a first directional coupler and the second optical coupler is a second directional coupler.

8. The dispersion compensator of claim 1, wherein the first length is less than the second length.

9. A dispersion compensator, comprising:
a waveguide having an input end for receiving an input optical signal and an output end for providing a filtered optical signal;
a first closed loop resonator; and
a tunable coupler coupling the input optical signal from the waveguide to the closed loop resonator, the tunable coupler including:
a Mach-Zehnder interferometer having first and second couplers, and first and second arms extending between the first and second couplers, the first arm having a first length and the second arm having a second length different than the first length;
the first optical coupler having an input and an output, the input configured to receive the input optical signal;
a differential phase cell including the first and second arms of the Mach-Zehnder interferometer, and an input and an output, the input of the differential phase cell being coupled to the output of the first optical coupler, the first arm of the Mach-Zehnder interferometer including a portion of the first closed loop resonator;
the second optical coupler of the Mach-Zehnder interferometer having an input and an output, the input coupled to the output of the differential phase cell and the output being configured to provide the filtered optical signal;

a tuning element configured to adjust a phase of light propagating in the second arm of the Mach-Zehnder interferometer, the light constituting at least a portion of the filtered optical signal; and a second closed loop resonator optically coupled to a portion of the second arm of the Mach-Zehnder interferometer between the first and second couplers, wherein the tuning element includes a thermal device located adjacent to the second arm of the Mach-Zehnder interferometer and a portion of the second closed loop resonator, the thermal device overlapping the portion of the second arm of the Mach-Zehnder interferometer and the portion of the second closed loop resonator to adjust a temperature of the portion of the second arm of the Mach-Zehnder interferometer and a portion of the second closed loop resonator.

10. The dispersion compensator of claim 9, wherein the tuning element is a first tuning element and the thermal device is a first thermal device, the dispersion compensator further including a second tuning element having a second thermal device in thermal communication with the first arm of the Mach-Zehnder interferometer.

11. The dispersion compensator of claim 9, wherein the differential phase cell is a first differential phase cell, the dispersion compensator further comprising:

a second differential phase cell having an input and an output; and a third optical coupler having an input and an output, the input of the second differential phase cell coupled to the output of the second optical coupler, the input of the third optical coupler being coupled to the output of the second differential phase cell, such that the output of the third optical coupler provides the filtered optical signal.

12. The dispersion compensator of claim 9, wherein the tunable coupler is configured to tune the input optical signal to alter a dispersion of the input optical signal.

13. The dispersion compensator of claim 11, wherein the tuning element is a first tuning element, the dispersion compensator including a second tuning element having a length, and first and second ends, the second differential phase cell having a first arm extending along a fourth portion of the waveguide, the first and second ends of the second tuning element being positioned along the first arm of the second differential phase cell, and the length of the second tuning element extending along the first arm of the second differential phase cell.

14. The dispersion compensator of claim 13, further comprising a controller selectively altering a power dissipation of the each of the first and second tuning elements based on a bit error rate.

15. The dispersion compensator of claim 9, wherein the first length is less than the second length.

* * * * *